Figure 8:
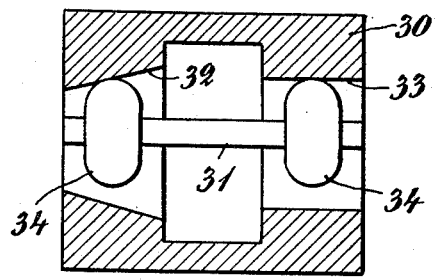

March 19, 1957    SVEN-ÅKE NORDEGREN    2,785,577
VIBRATOR
Filed Oct. 15, 1953    2 Sheets-Sheet 1
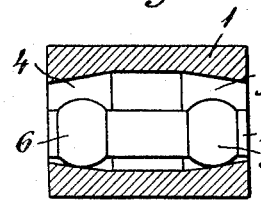
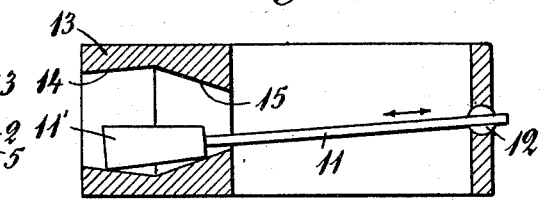
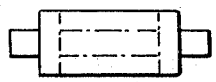
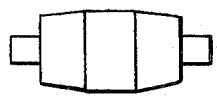
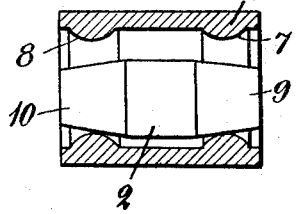
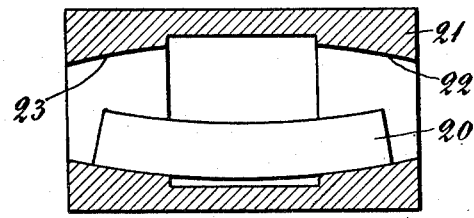
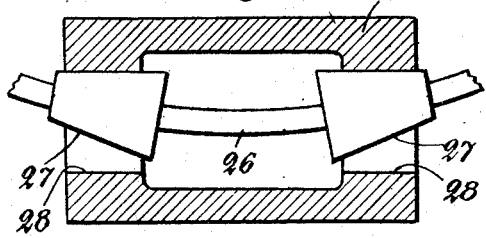
INVENTOR.
SVEN-ÅKE NORDEGREN March 19, 1957 SVEN-ÅKE NORDEGREN 2,785,577
VIBRATOR
Filed Oct. 15, 1953

INVENTOR.
SVEN-ÅKE NORDEGREN

United States Patent Office 2,785,577
Patented Mar. 19, 1957

2,785,577
VIBRATOR

Sven-Åke Nordegren, Stockholm, Sweden, assignor to Vibro-Plus Corp., Woodside, N. Y., a corporation of Delaware Application October 15, 1953, Serial No. 386,313

Claims priority, application Sweden October 21, 1952

5 Claims. (Cl. 74—87)

This invention relates to a guiding arrangement in vibrators having an axially movable roller body which rolls along a substantially circular roller track or race executing a planetary movement. Such roller bodies may be driven in any suitable known manner such as for instance by a rotating magnetic field, by gears allowing axial displacement, by flexible shafts, friction couplings and the like.

Every roller (except possibly and under certain circumstances, a ball) moving along a circular roller track or race bears against the track in such a manner that the track may be considered to comprise two spaced race parts, principally one for each end portion of the roller counted in the direction of the axis of rotation of the roller body. As it is not possible in practice, however, to produce absolutely the same diameter on two accurately determined parts of the track and the roller body, the roller body, in the vibrators of the type in question, will always exhibit a certain tendency to twist in one direction or the other on account of the fact that it assumes an oblique position, owing to the relation between the diameters of the parts of the roller track and the roller body cooperating with one another being dissimilar at the two ends. For this reason a tendency to axial displacement in the track arises in the roller body, which under certain conditions may be particularly troublesome.

When manufacturing a vibrator of the said type in which the roller body is axially free, it is obvious, therefore, that special measures must be taken to ensure that the roller body will not be displaced too far in the axial direction during its planetary rolling movement. It has been found disadvantageous to guide the roller body by means of end members against which members the ends of the roller body are intended to bear, as the tendency of the roller body to become displaced in an axial direction may be so great that it may result in a very considerable wear on the end members and, furthermore, the use of such end members naturally gives rise to a certain friction which may effect the movement of the roller body adversely. In certain cases the roller body may, of course, be guided by axial thrust or spherical bearings for example, this being particularly the case when the roller body operates as a conical pendulum, but in such cases the bearing is subjected to heavy axial stresses under unfavourable conditions.

The present invention has for its object to provide a solution of the problem of obtaining axial guiding for an axially movable roller body which enables the roller body itself to find a position of equilibrium during its planetary movement.

The arrangement according to the invention is principally characterized in that the roller track and/or the part of the roller body cooperating with the roller track is composed of two parts, one of which has a mainly progressively increasing diameter in the direction towards the other part, this diameter also increasing in the said direction to a greater extent than the diameter of the other part, the axial sectional contour of the parts of the track and of the roller body surface cooperating therewith being such that the roller body at rest contacts each track part in substantially one single point.

The invention will now be more particularly described with reference to the accompanying drawings which show diagrammatically a number of different constructional forms of the arrangement according to the invention.

Figure 9:
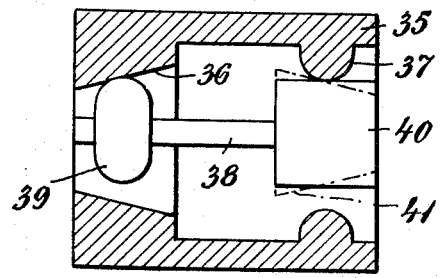
Figure 10:
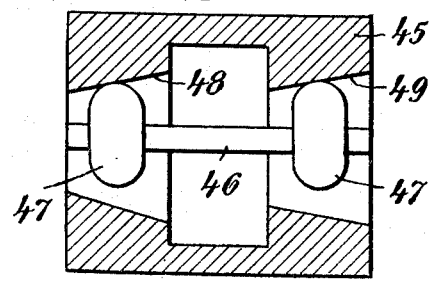

In the drawing Fig. 1 is an axial section through a roller track with a roller body according to one form of construction of the invention. Figs. 2 and 3 show roller bodies which may replace the roller body in Fig. 1. Fig. 4 is an axial section through another form of construction of the vibrator according to the invention. Fig. 5 illustrates the adaptation of the invention to a vibrator with a roller body operating as a pendulum. Fig. 6 shows a more complicated form of construction of the invention in which the deflection of the roller body during its rolling movement is utilized to obtain a greater contact surface between the roller body and the roller track, and Fig. 7 shows the application of the same principle as in Fig. 6 to a sleeve-shaped roller body which moves around a flexible central shaft. Figs. 8, 9 and 10 show axial sections through modified forms of construction of roller body vibrators which demonstrate the various possibilities available for forming the roller body and the roller tracks in such a way that the object of the invention is achieved.

In Fig. 1 the two main elements of the vibrator are indicated at 1 and 2, respectively. According to requirements the one or the other part may be held stationary and regarded as the roller track whilst the moving part may be regarded as the vibrator's roller body. The roller body may, of course, be driven in a number of different ways which have nothing to do with the present invention. If the sleeve-shaped element indicated by 1 in Fig. 1 is regarded as the vibrator's roller track whilst the element indicated by 2 is regarded as the vibrator's roller body, it will be seen from the drawing that the roller track is divided into two parts, 3 and 4, both of which are conical or in any event have an increasing diameter in the axial direction, expanding in the direction towards one another. On the other hand the element or roller body 2 is provided with two spherical supporting parts, 5 and 6, respectively, which bear on the surfaces 3 and 4. The element or roller body 2 is freely movable in an axial direction, and in the event of twisting of the roller body occurring in one direction or the other owing to differences in the diametrical relations between the circle lines where the spherical parts 5 and 6 and the roller tracks 3 and 4 cooperate, while the vibrator is working, that is to say, while the roller body 2 is in rotation, it is obvious that the roller body 2 through its own twisting movement will gradually assume a position in which the diametrical relations between the roller track parts and the spherical parts of the roller body will be exactly similar at both ends of the roller body so that the axial position of the latter will remain stable.

Instead of constructing the roller body 2 with spherical supporting parts it may be entirely cylindrical as shown in Fig. 2, or in a conical spool form as shown in Fig. 3. The only difference which then arises will be that the rolling bodies according to Figs. 2 and 3 will contact the conical roller track surfaces 3 and 4 at their end faces. The cylindrical or spool-shaped roller body may, of course, be narrower at the centre and resemble a shaft with fixed runners as indicated by the dotted lines in Fig. 2.

In the form of construction according to Fig. 4 the same conditions apply as in Fig. 1, but here the sleeve-shaped vibrator element 1 has been provided with convex supporting surfaces at two axially separated points. These supporting surfaces are indicated at 7 and 8. The other element or roller body 2 is provided instead with conical end parts indicated and 9 and 10 which cooperate with the said convex supporting surfaces. The result is the same as in Fig. 1, namely, the roller body will gradually assume a position in which the conditions are the same at both end parts of the roller body so that the axial position of the roller body will remain stable. The sleeve-shaped element in Fig. 4 may, of course, serve equally satisfactorily as the roller body, while the central element 2 is employed as the fixed roller track.

In Fig. 5 11 indicates a roller body operating as a conical pendulum which is supported to be axially movable in a spherical bearing 12 at one end of the vibrator whilst a thickened pendulum end 11' cooperates with a roller track 13 which according to the invention is divided into two parts, 14 and 15, both of which are conical and expand in the direction towards one another.

Fig. 6 is a diagrammatic view of a form of construction in which the roller body 20 is of such a nature that it is deflected outwards during its planetary movement, owing to centrifugal force, relative to the centre of the roller track 21. In other words, in all essential respects the roller body 20 is cylindrical when the vibrator is not working whereas it will be deflected when the vibrator is in operation. These conditions are utilized according to the invention to obtain a large contact surface, that is to say, to obtain contact between the roller body and the roller track over an appreciable axial length, and consequently the two roller track parts 22 and 23 of the roller track 21 are so formed that they expand in the direction towards one another in accordance with the curve to be described by the roller body while the vibrator is in operation.

In Fig. 7 the same idea is adopted as in Fig. 6 with the difference that the roller body 25 is here constructed as a sleeve which moves around a shaft 26 passing through the sleeve and provided with bearing surfaces serving as roller tracks. The shaft 26 is intended to be fixed at its ends in a frame or the like and the shaft is so weak that it is deflected by the planetary movement of the roller body 25, as indicated in the drawing. By providing the two ends of the shaft 26 with substantially conical bearing surfaces 27 having a conicity which essentially corresponds to the deflection of the shaft 26 under the stresses set up on the movement of the roller body, the roller body 25 which has cylindrical supporting surfaces 28 will make contact with the shaft over a relatively great axial length. In both of the last-mentioned forms of construction a lower surface pressure is obtained on the movement of the roller body over the roller track, which is advantageous as the wear of the races is thereby decreased.

In Fig. 8 a roller body vibrator is shown in which it is also immaterial whether the outer sleeve-shaped part 30 or the internal element 31 is movable. The sleeve-shaped part 30 is here provided with a supporting surface 32 which expands conically in the direction towards the other supporting surface 33 which is cylindrical. As in Fig. 1 the internal element 31 is provided with spherical supporting parts 34. In this case too the moving part, irrespective of whether it is the sleeve-shaped part 30 or the internal element 31, will by itself assume such an axial position relatively to the other element in the vibrator that the conditions of diameter relation at the two parts of the roller track are exactly similar. The action will, of course, be equivalent if the sleeve-shaped part is provided with the spherical supporting parts and the internal element with a conical and a cylindrical supporting part.

In Fig. 9, which shows a roller body vibrator of the same construction in principle as in Fig. 8, the sleeve-shaped part 35 is provided with a conical roller track part 36 which expands in the direction towards the other roller track part 37 which has spherical supporting surfaces. The internal element 38 in this roller body vibrator is provided with a spherical supporting part 39 which cooperates with the conical roller track part 36, and with a cylindrical supporting part 40 which cooperates with the spherical roller track 37. The cylndrcal supportng part 40 may likewise be conical as indicated by dotted lines at 41, the conicity of this part being then such that the diameter increases in the direction of the supporting part 39. In both cases the moving element, irrespective of whether it consists of the sleeve-shaped part 35 or the internal element 38, will twist itself into a position of equilibrium in which the diametrical relation between the cooperating parts of the roller track and the roller body are exactly similar at both ends of the moving element.

Finally, Fig. 10 shows an extreme form of construction for the roller body vibrator according to the invention in which the sleeve-shaped outer part 45 or the internal element 46 may be stationary, while the other part is movable. The internal element 46 is provided with spherical supporting parts 47 whilst the outer sleeve-shaped element 45 is provided with two roller tracks, one of which 48 is conical and expands in the direction of the other with a certain conical angle. The other roller track 49 is also conical and expands in the direction away from the roller track 48 but with a smaller conical angle than that of the roller track 48. In this case also the functioning will be analogous with what has been described previously, as the roller body in the course of its rotation will always assume a position in which the conditions of diameter relation at the two ends of the roller body are similar.

The operating principles of vibrators constructed in accordance with the present invention are illustrated by a pencil sharpened at both ends, the tapered ends being supported by a pair of parallel straight edges. When rolled on the straight edges the pencil will have a tendency to move to and fro in an axial direction, each axial displacement producing a retardation of the end of the pencil closer to the center of the track formed by the straight edges. Such retardation results from the fact that the retarded end contacts its related straight edge at a point where the periphery of the tapered end is smaller than before. The retardation causes the pencil to occupy a slightly awry position but immediately thereafter, the velocity of the retarded end increases due to the fact that the straight edge contacts a larger diameter of the pencil, this causing a correction of the position of the pencil on the straight edges.

It will be apparent that the foregoing principles are common to the above-described embodiments of the invention, a circular track being substituted for the parallel straight edges. Therefore, it is possible to vary the diameter of the track to produce the same result obtained by varying the diameter of the roller. This will be clear if Figs. 1 and 4 are compared, the latter working exactly as in the case of the pencil illustration because the guides 7 and 8 are of equal length. On the other hand, in Fig. 1 the active diameter of the roller at each end is constant and the diameter of the circular track is varied. In Fig. 3 a double taper on both the track and roller body is illustrated but as pointed out above, only the extreme ends of the roller body engage the circular raceways, such engagement resulting in a point contact.

If the roller body and track are both rigid, it is essential that the contacts be substantially point contacts to achieve the desired pivotal action from the retarded end, such action being necessary to reverse the axial displacement. However, the same result can be obtained without a point contact if either the roller body or the circular track is deflectable, as indicated in the typical inventive embodiments of Figs. 6 and 7. As pointed out above, the Figs. 6 and 7 examples depict the roller bodies under working conditions with centrifugal forces acting on the bodies causing deflection thereof. This deflection may produce line contacts between the roller and the track under working conditions but at rest, the roller 20 of Fig. 6 and the shaft 26 of Fig. 7 assume a straight cylindrical shape. However, the linear contact between the roller and the track obtained by the elastical deflection or deformation of the vibrator part does not change the principles of operation of vibrators according to the present invention. Thus, the movements of the roller body will always be determined by the relation between the diameters of the roller body and the track in the planes perpendicular to the axis of the vibrator where the contact pressure between the respective ends of the roller body and the track is maximum. Obviously, the maximum contact pressure is found at the points where the roller body contacts the tracks when the vibrator is at rest.

In all embodiments of the inventive principle shown and described here with the exception of the form shown in Fig. 5, the roller body, irrespective of whether it consists of the sleeve-shaped or the central part, is assumed to work with its axle substantially parallel with the longitudinal axle of the stationary element. This is not essential, of course, as may be seen from Fig. 5, since by constructing the supporting parts of the cooperating roller track and roller body at one end of the vibrator with a different average diameter to that of the corresponding parts at the other end of the vibrator, the roller body may be caused to move without special guiding in a track in which its axle will intersect the central axle of the stationary part at a point outside the roller track. In this case also, however, it must be possible for the roller body to assume a position in which the conditions of diameter relation are the same at both ends or both supporting parts of the roller body.

Summarizing the principles of the vibrator mechanism of the present invention, the roller body executes a planetary motion within the circular track and at the same time is free to shift in an axial direction within the circular track. Furthermore, the roller body and the roller tracks are so developed that if $R_e$ and $R_r$ represent the radii of the roller tracks at the left and right points, respectively, where the roller body contacts the track with the greatest pressure and $r_e$ and $r_r$ are the radii of the roller body at the same points, the expression $$\frac{R_r}{r_r} - \frac{R_e}{r_e} = 0$$

at the position of axial stability of the roller body with respect to the roller tracks. As the roller body moves in an axial direction away from the stable position toward the right, $$\frac{R_e}{r_e}$$

will progressively increase relative to $$\frac{R_r}{r_r}$$

likewise as the roller body moves in an axial direction away from the stable position toward the left, $$\frac{R_r}{r_r}$$

will progressively increase relative to $$\frac{R_e}{r_e}$$

The effect in each case is to increase the linear velocity of the end of the roller body which is moving away from the stable position, said increase in velocity advancing the position of that end of the roller body ahead of the opposite end, thereby having the effect of reversing the direction of the axial displacement of the roller body.

It was mentioned in the introduction that the two parts of the roller track or roller body should exhibit a mainly progressive increasing or decreasing diameter. This implies that the diameter need not necessarily be exactly increasing or decreasing when the section of the parts is examined under a magnifying glass for example. Practical circumstances render impossible the economical production of the surface of a cone or cylinder which is entirely smooth, nor is this necessary. In reality, under ordinary working conditions in a lathe for example the surface will be practically step-shaped. The roller body itself wears down the roller track during its operation, however, so that the required progression of the surfaces is obtained.

The invention is not limited, of course, to the forms of construction shown in the drawing but may be applied to different types of vibrators with an axially movable roller body.

What I claim is:

1. A vibrator mechanism comprising a hollow body, the internal periphery of which forms a circular track, a rotatable body adapted to be driven along the internal periphery of the hollow body and guided by the track to execute a planetary motion, said rotatable roller body being displaceable in an axial direction within the track, said track supporting the roller body at rest by substantially a point contact at two locations, the roller track being formed in two parts, the diameter of at least one of said parts progressively increasing in the direction toward the other part, said diameter also increasing in the said direction to a greater extent than the diameter of the other part, the arrangement being such that any axial displacement of the roller body will have the effect of increasing the linear velocity, in a direction perpendicular to the axis of the roller body, of the end of the roller body leading the axial displacement relative to the velocity of the other end, thereby producing an angular shift of the axis of the roller body which, in turn, will produce a reversal in the direction of the axial displacement of the body.

2. A vibrator mechanism as set forth in claim 1 wherein one of the bodies is deflectable during operation and the other body is relatively rigid, and characterized in that the rigid body is provided with roller surfaces of varying diameter in the axial direction, so that during operation the deflectable body will make line contacts with the roller surfaces, as distinguished from the point contacts in the rest position of the roller body.

3. A vibrator mechanism comprising a hollow body, the internal periphery of which forms a circular track, and a rotatable roller body adapted to be driven along the internal periphery of the hollow body and guided by the track to execute a planetary motion, said rotatable roller body being displaceable in an axial direction within the track, said track supporting the roller body at rest by substantially a point contact at two locations, the relationship of the radii of the track and the roller body at each of the points of contact being such that, as the roller body is displaced during operation from an axially stable position in one direction, the velocity of the end of the roller body leading the axial displacement will increase in a direction perpendicular to the axis of the roller body relative to the velocity of the other end, thereby producing an angular shift of the axis of the roller body to reverse the direction of the axial displacement of the roller body.

4. A vibrator mechanism as set forth in claim 3 wherein one of the said bodies is deflectable during operation so that the point contacts at rest become line contacts during operation.

5. A vibrator mechanism comprising a hollow body, the interior of which is formed by a circular track, and a rotatable roller body adapted to be driven along the internal periphery of the hollow body and guided by the track to execute a planetary motion, said rotatable roller body being displaceable in an axial direction within the track, said track supporting the roller body at rest by substantially a point contact at left and right locations, the relationship of the radii of the track and roller body at each point contact being such that if $R_e$ and $R_r$ are the radii of the track at the left and right points, respectively, where the roller body contacts the track with the greatest pressure during operation and $r_e$ and $r_r$ are the radii of the roller body at the same points, respectively, then the expression $$\frac{R_r}{r_r} - \frac{R_e}{r_e} = 0$$

at the position of axial stability of the roller body with respect to the track, and as the roller body moves in a rightward axial direction away from stable position, $$\frac{R_e}{r_e}$$

will progressively increase relative to $$\frac{R_r}{r_r}$$

and similarly as the roller body moves in a leftward axial direction away from said stable position, $$\frac{R_r}{r_r}$$

will progressively increase relative to $$\frac{R_e}{r_e}$$

the effect in each case being to increase the linear velocity of the end of the roller body which is moving away from the stable position, thereby reversing the direction of axial displacement of the roller body.

References Cited in the file of this patent
UNITED STATES PATENTS

| | | |
|---|---|---|
| 2,204,472 | Caquot | June 11, 1940 |
| 2,546,806 | Wenander | Mar. 27, 1951 |